(12) United States Patent
Jung et al.

(10) Patent No.: US 7,245,948 B2
(45) Date of Patent: Jul. 17, 2007

(54) CELLULAR PHONE AND AUTOMATIC REVOLUTION METHOD THEREOF

(75) Inventors: Sung Tai Jung, Suwon-Shi (KR); Tae Hyeong Lim, Suwon-Shi (KR); Young Ok Chung, Suwon-Shi (KR)

(73) Assignee: Samsung Electro-Mechanics Co., Ltd., Suwon-Shi, Kyungki-Do (KR)

( * ) Notice: Subject to any disclaimer, the term of this patent is extended or adjusted under 35 U.S.C. 154(b) by 557 days.

(21) Appl. No.: 10/687,733

(22) Filed: Oct. 16, 2003

(65) Prior Publication Data

US 2004/0198474 A1    Oct. 7, 2004

(30) Foreign Application Priority Data

Apr. 1, 2003    (KR) ...................... 10-2003-0020630
Apr. 1, 2003    (KR) ...................... 10-2003-0020631

(51) Int. Cl.
   *H04M 1/00*    (2006.01)
(52) U.S. Cl. .................. 455/575.1; 455/90.3; 455/347; 375/433.11; 375/433.13
(58) Field of Classification Search .............. 455/575.1, 455/575.3, 90.3, 566, 556.1, 347, 344, 348, 455/346, 424, 425, 456.5, 456.6, 561, 550.1, 455/162.1, 163.1, 573.3; 324/207.2, 207.22; 379/433.11–433.13, 440, 433.01, 447; 16/347, 16/376, 351, 365; 348/333.06, 333.07; 342/207.2, 342/207.22
See application file for complete search history.

(56) References Cited

U.S. PATENT DOCUMENTS

| | | | |
|---|---|---|---|
| 6,115,886 A * | 9/2000 | Fujita ........................... | 16/330 |
| 6,175,990 B1 * | 1/2001 | Kato et al. ..................... | 16/334 |
| 6,275,376 B1 * | 8/2001 | Moon .......................... | 361/683 |
| 6,353,733 B1 * | 3/2002 | Murray et al. ............. | 455/90.1 |
| 6,374,089 B1 * | 4/2002 | Till ............................. | 455/90.1 |
| 6,484,016 B1 * | 11/2002 | Cheon ........................ | 455/90.1 |
| 6,549,789 B1 * | 4/2003 | Kfoury ..................... | 455/550.1 |
| 2003/0040288 A1 * | 2/2003 | Kang et al. ................... | 455/90 |
| 2004/0045131 A1 * | 3/2004 | Barnett ........................ | 16/367 |
| 2004/0056651 A1 * | 3/2004 | Bersana ................... | 324/207.2 |
| 2004/0062171 A1 * | 4/2004 | Huang ....................... | 369/75.1 |
| 2004/0189856 A1 * | 9/2004 | Tanaka ........................ | 348/345 |
| 2005/0160558 A1 * | 7/2005 | Kim ........................... | 16/367 |
| 2005/0192066 A1 * | 9/2005 | Park et al. ................ | 455/575.3 |

FOREIGN PATENT DOCUMENTS

JP    2003-056545    *    2/2003

* cited by examiner

*Primary Examiner*—Edward F. Urban
*Assistant Examiner*—Charles Chow
(74) *Attorney, Agent, or Firm*—Darb & Darby

(57) ABSTRACT

A folder type cellular phone and an automatic folder method includes a main body having a key pad and a hinge thereof in a first direction, a folder having a display, a driving source disposed on a lower portion of the folder in the first direction to generate a driving force, a power transmission unit having one end coupled to the driving source and the other end coupled to the folder to transmit the driving force to folder to rotate with respect to the main body when the folder is in an open state, and a rotation controller coupled to the power transmission unit and disposed in a housing installed at the hinge of the main body in a second direction perpendicular to the first direction to automatically and/or manually rotate the folder with respect to the main body.

13 Claims, 12 Drawing Sheets

CELLULAR PHONE AND AUTOMATIC REVOLUTION METHOD THEREOF

CROSS-REFERENCE TO RELATED APPLICATION

This application claims to benefit of Korean Patent Application Nos. 2003-20630 filed Apr. 1, 2003, and 2003-20631 filed Apr. 1, 2003, in the Korean Intellectual Property Office, the disclosure of which is incorporated herein by reference.

BACKGROUND OF THE INVENTION

1. Field of the Invention

The present invention relates to a cellular phone, and more particularly, to a foldable cellular phone having a main body, a key pad disposed on the main body, a folder folding and rotating with respect to the main body, and a LCD display, and a method thereof.

2. Description of the Related Art

Generally, a cellular (wireless or mobile) phone is classified into one of a bar type having a key pad exposed outside, a flip type having the key pad covered by a cover, and a folder type folding in half.

The folder type cellular phone includes a main body having a key pad, and a folder having an LCD display and being folded with respect to the main body. The key pad of the main body is exposed to an outside of the cellular phone. According to a folding operation of the folder according to Japanese patent publication (patent publication no. 11-30226), the folder is not only foldable with respect to the main body but also rotatable with respect to the main body in an open (unfolded) state to meet various user demands.

FIG. 1 is a perspective view showing the cellular phone of the Japanese patent publication. The cellular phone includes a main body 4 having a key pad 3, and a folder 2 folded and unfolded with respect to the main body 4 and having an LCD display 1.

The main body 4 includes one end provided with a pair of cylindrical supports 5 and a cylindrical hinge 5a rotatably fixed between the cylindrical supports 5, and the folder 2 is rotatably connected to a lower portion of the cylindrical hinge 5a to be folded and unfolded in a direction of an arrow A.

The folder 2 is provided with a rotation unit 10 rotating the folder in a direction of an arrow B. The rotation unit 10 is vertically and/or fixedly coupled to the cylindrical hinge 5a to rotate with respect to the cylindrical hinge 5a and is coupled to the folder 2.

FIG. 2 is a cross-sectional view showing the rotation unit 10 provided on a lower portion of the folder 2 of the cellular phone shown in FIG. 1. As shown in FIG. 2, the rotation unit 10 includes a rotation shaft 6 having a hollow cylindrical structure coupled to the lower portion of the folder 2, a fixed shaft 7 fixed on the cylindrical hinge 5a to correspond to the rotation shaft 6, a nut coupled of the fixed shaft 7, and a coil spring 9 extended (released) and compressed by the nut 8.

The rotation shaft 6 includes an inward flange 6a having a portion formed on a lower portion of the rotation shaft to be bent in an inward direction of a hollow inside of the rotation shaft 6, a boss 7a formed on the fixed shaft 7 in a lengthwise direction along a center line of the fixed shaft 7 to protrude toward the inward direction, and a screw formed on an outer surface of the boss 7a.

The boss 7a of the fixed shaft 7 is inserted into the inward flange 6a through the hollow inside of the rotation shaft 6, and the coil spring 9 and the nut 8 are sequentially disposed on the outer surface of the boss 7a of the fixed shaft 7.

The nut 8 is coupled to the screw of the boss 7a, the coil spring 9 is disposed between the nut 8 and the inward flange 6a so that the coil spring 9 is not released from an outside of the boss 7a of the fixed shaft 7 due to the nit 8 and the inward flange 6a.

When a user rotates the folder 2 with respect to the main body 1 in the direction of the arrow B according to a user manipulation, the rotation shaft 6 rotates in the same direction B as the folder 2 while being supported by the coil spring 9, so that the folder 2 rotates with respect to the center line of the rotation unit 10.

In the cellular phone having the above structure, since the cylindrical hinge 5a is rotatably supported by the cylindrical support 5 of the main body 4 to enable the folder 2 to rotate the folder 2 with respect to the main body 4. When the folder 4 is opened with respect to the main body 4, the folder 2 is rotated with respect to the center line of the fixed unit 10 so that the user is able to see the LCD display 1 in a desirable direction.

Since the folder 2 is rotates in the direction B according to the user manipulation of the cellular phone at a user hand, it is very inconvenient that the user should hold at according to the user manipulation of the cellular phone while the user needs to rotate the folder 2 using the other hand.

The user needs to use both hand to rotate the folder as described above. If the user holds the cellular phone using the both hand, the user cannot rotate the folder 2 with respect to the main body 2 in the direction B.

If a camera (not shown) is mounted on the main body 4, an image sensed through the camera can be displayed on the LCD display 1 to show a state of the sensed image.

However, when the user needs to show the sensed image in an opposite direction, the folder 2 having the LCD display 1 needs to display the image in an opposite direction of a front surface of the camera. Therefore, the user needs to manually open the main body 4.

SUMMARY OF THE INVENTION

In order to solve the above and/or other problems, it is an aspect of the present invention to provide a cellular phone including a main body and a folder automatically or manually rotating with respect to the main body while the the folder is unfolded to open the cellular phone and to locate a display surface of a display in opposite sides of the cellular phone, thereby causing an interference between the display surface and a rotation unit of the cellular phone.

It is another aspect of the present invention to provide a cellular phone provided with a camera and automatically or manually rotated so that a user can see an image sensed through the camera in opposite directions of the cellular phone.

Additional aspects and/or advantages of the invention will be set forth in part in the description which follows and, in part, will be obvious from the description, or may be learned by practice of the invention.

To achieve the above and/or other aspects, there is provided a cellular phone including a main body having a key pad and a hinge thereof in a first direction, a folder having a display displaying data received from the main body, a driving source disposed on a lower portion of the folder in the first direction to generate a driving force, a power transmission unit having one end coupled to the driving source and the other end coupled to the folder to transmit the driving force to folder to rotate with respect to the main body when the folder is in an open state, and a rotation controller coupled to the power transmission unit, disposed in a housing installed at the hinge of the main body in a second direction perpendicular to the first direction to automatically and/or manually rotate the folder with respect to the main body.

According to another aspect of the present invention, it is provided an automatic folder folding method used with a cellular phone, the method including inputting a rotation signal to a motor to rotate a folder with respect to a main body, determining whether the folder is in an open or close state to rotate the folder according to the rotation signal, determining whether a display of the folder is in an initial or opposite position when the folder is in the open state, driving the motor in one of a forward direction and a reverse direction to rotate the folder according to a rotation direction determined by the initial position of the folder;

completing a rotation of the folder by a predetermined rotation angle, and cutting off the rotation signal from the motor to terminate the rotation of the folder.

According to another aspect of the present invention, it is provided an automatic folder folding method used with a cellular phone, the method including inputting a rotation signal to a motor to rotate a folder with respect to a main body, determining whether the folder is in an open state to rotate the folder according to the rotation signal, determining whether a display of the folder is in an initial or opposite position when the folder is in the open state, driving the motor in one of a forward direction and a reverse direction to rotate the folder according to a rotation direction determined by the initial position of the folder, determining whether a rotation completion detecting sensor is in an on state to detect a rotation of the folder according to completion of the rotation of the folder by the motor, and cutting off the rotation signal from the motor to terminate the rotation of the folder upon determining that the rotation completion detecting sensor is in the on state.

BRIEF DESCRIPTION OF THE DRAWINGS

These and/or other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
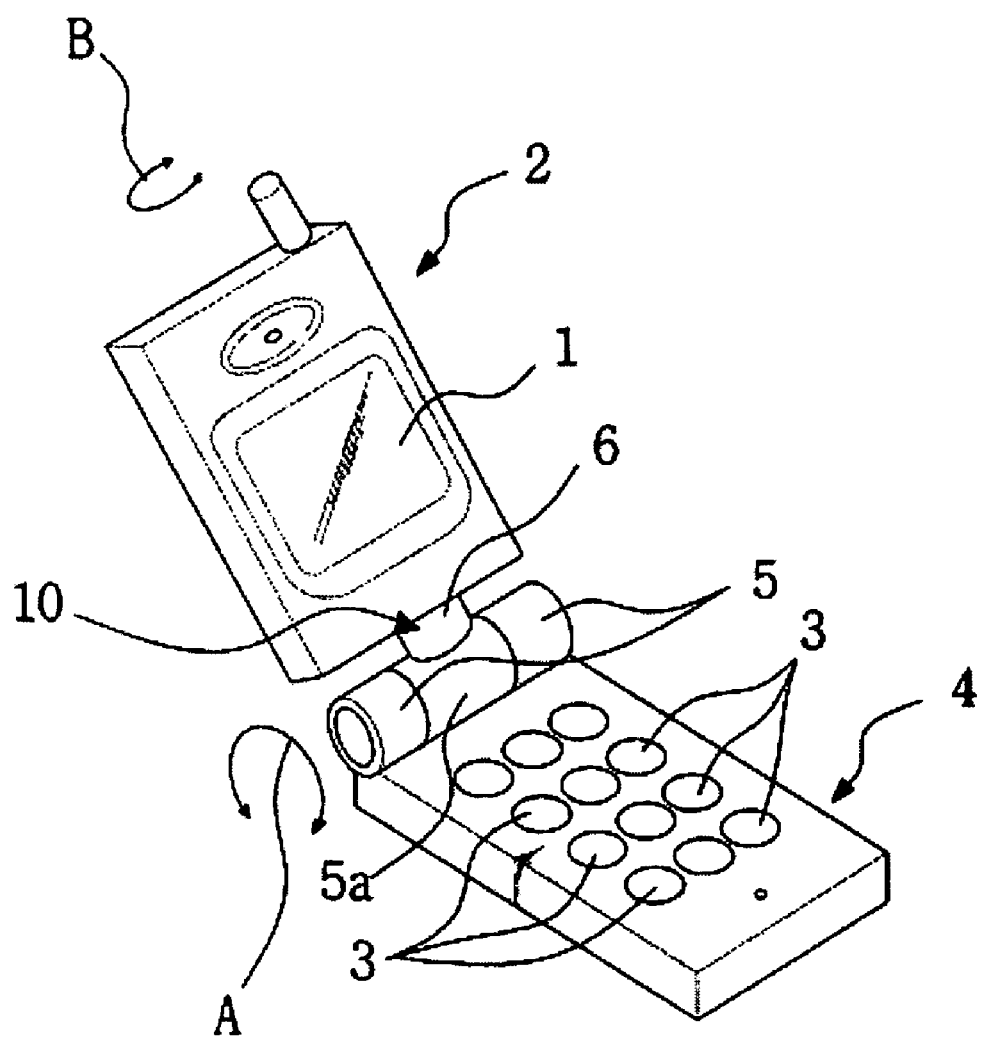
FIG. 1 is a view showing a conventional cellular phone.
Figure 2:
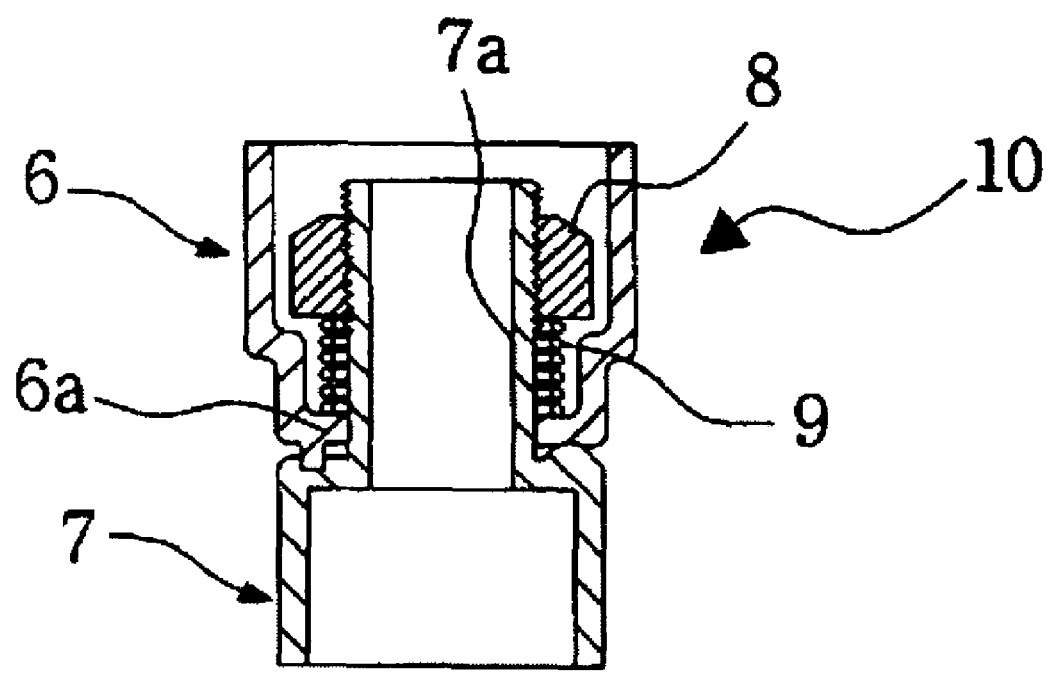
FIG. 2 is a cross-sectional view showing a rotation unit of the cellular phone shown in FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Figure 3:
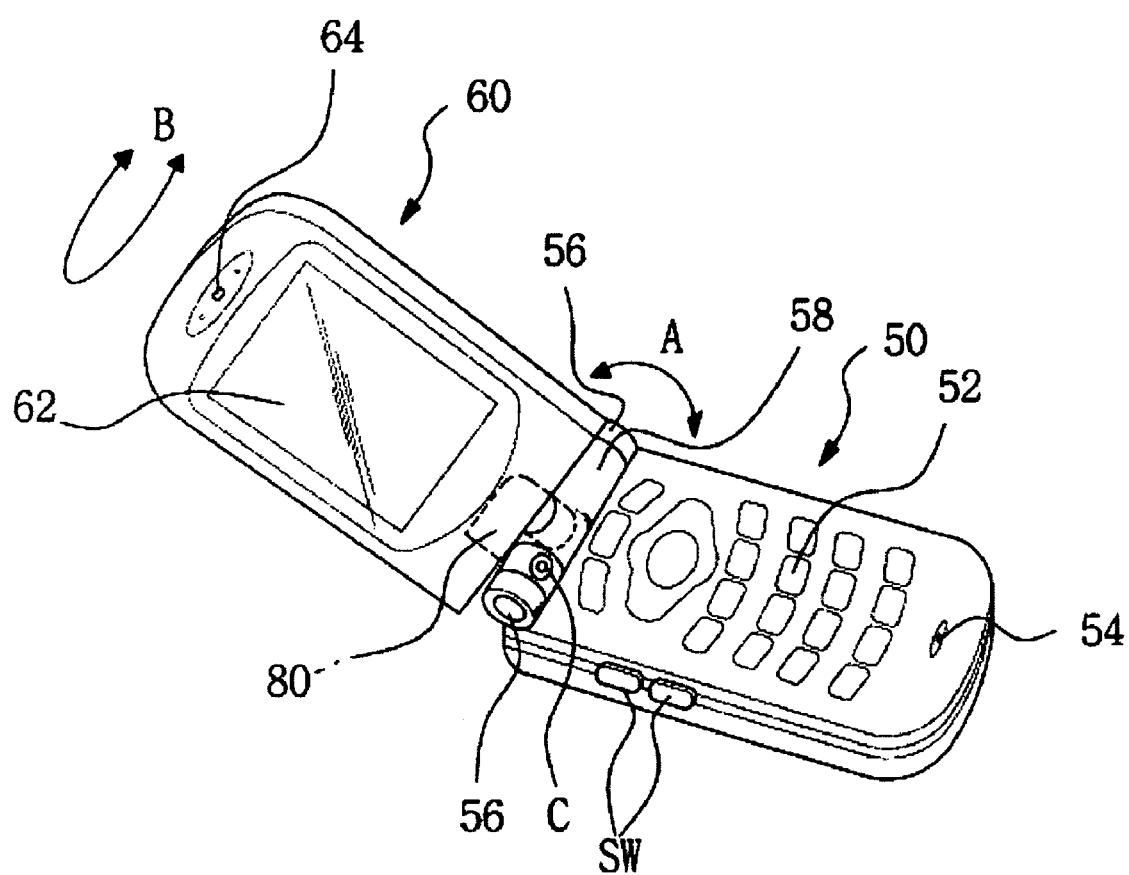
FIG. 3 is a view showing a cellular phone according to an embodiment of the present invention.
Figure 4:
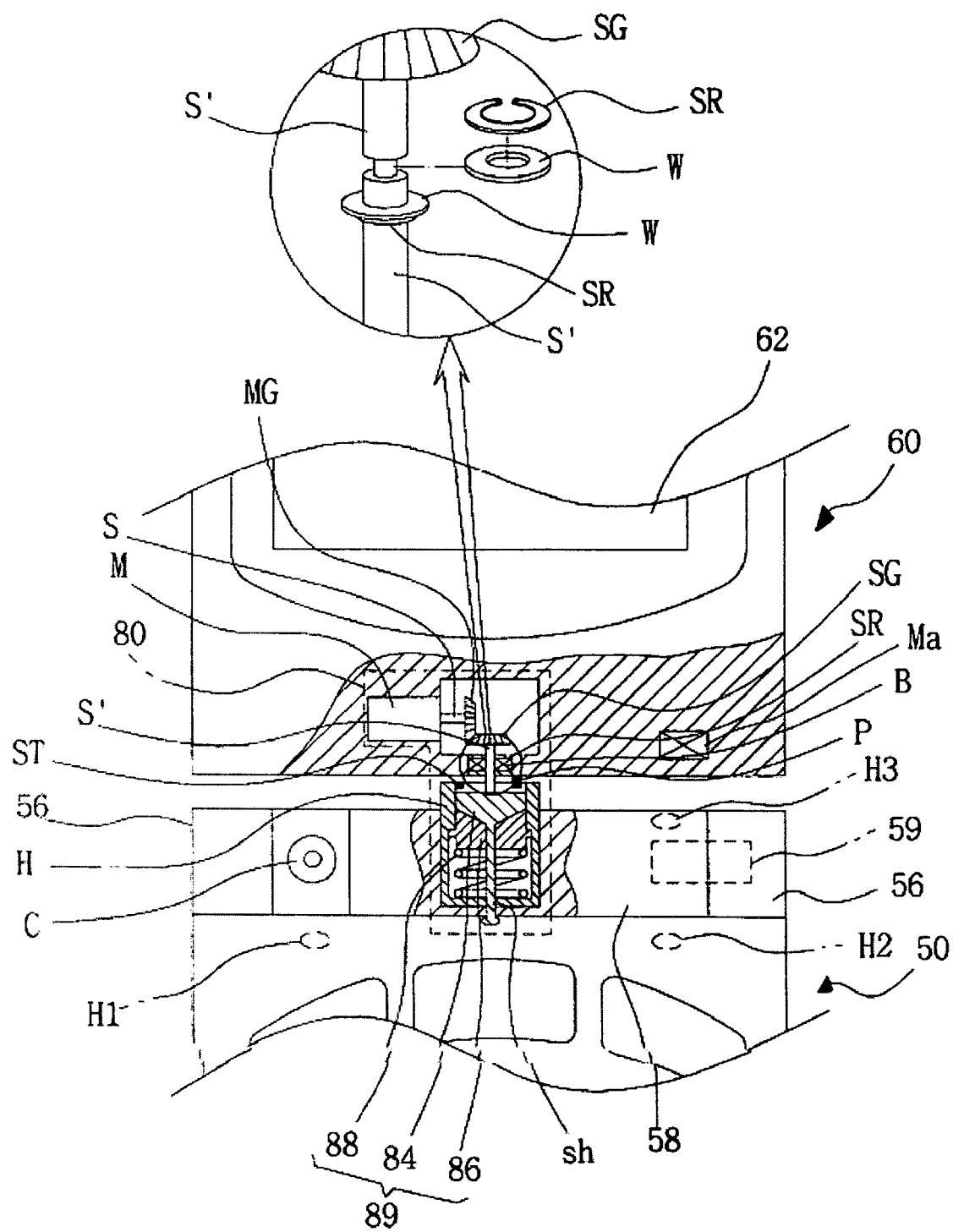
FIG. 4 is a partial cross-sectional view showing a rotation controller of a rotation unit of the cellular phone of FIG. 3.
Figure 5:
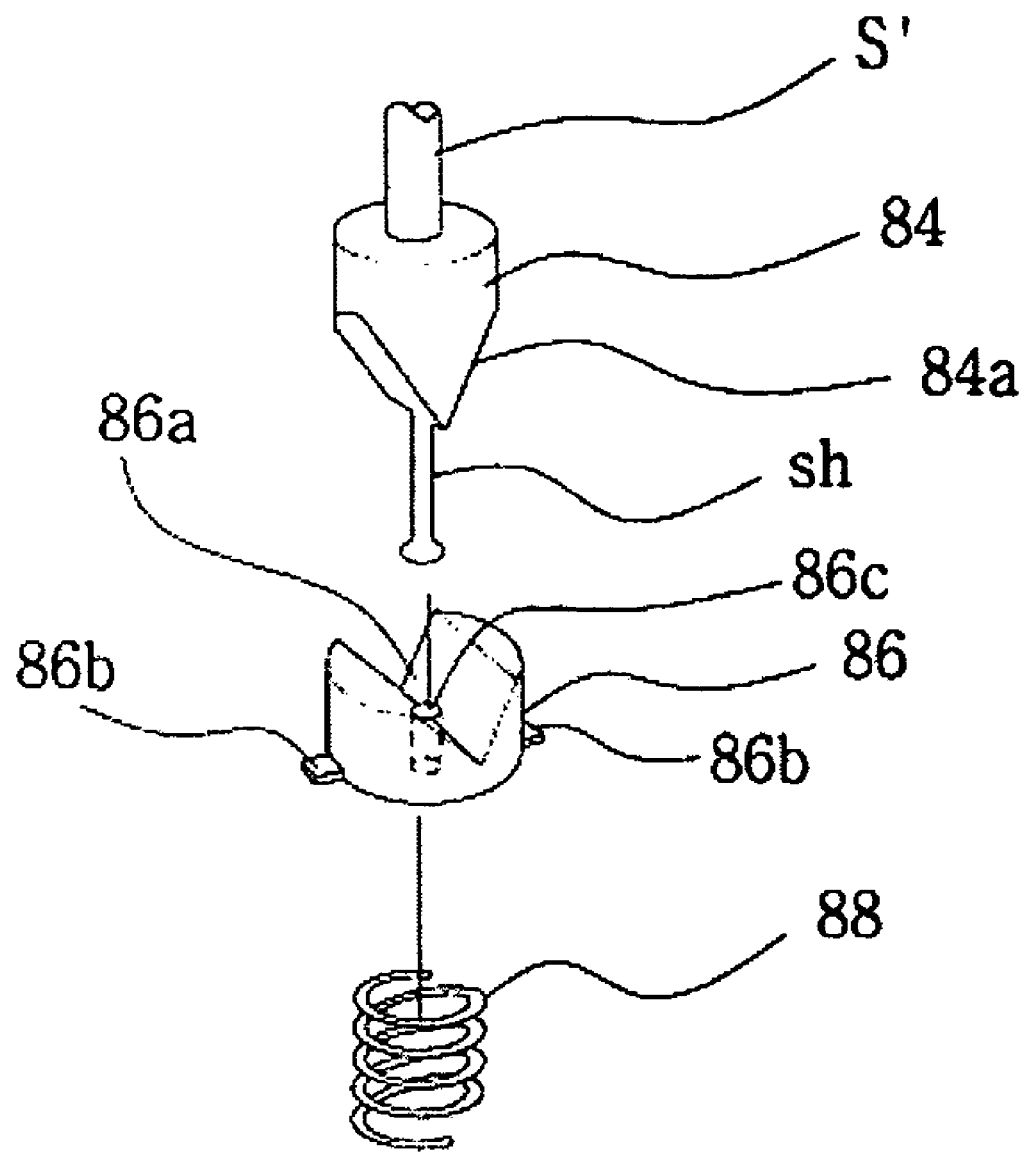
FIG. 5 is an exploded view showing the rotation controller of the rotation unit of the cellular phone shown in FIGS. 3 and 4.
Figure 6:
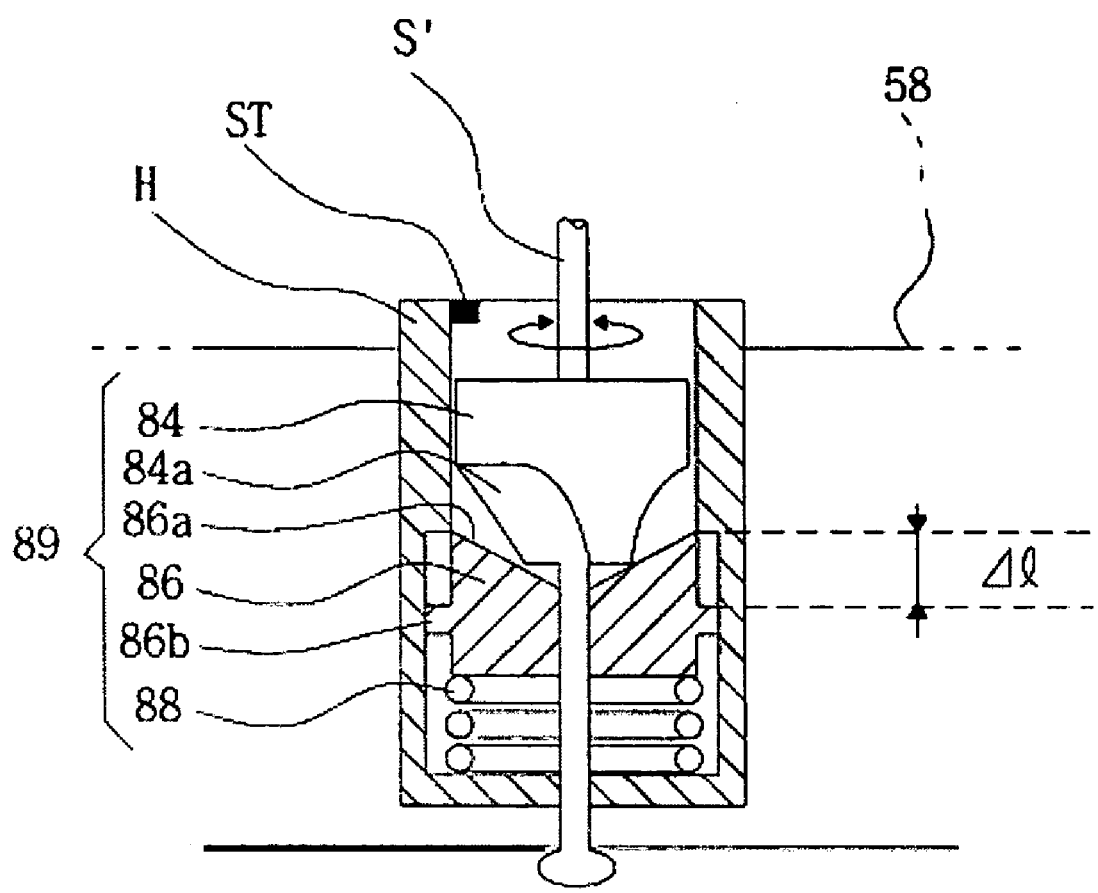
FIG. 6 is a cross-sectional view of the rotation controller of the rotation unit of the cellular phone shown in FIG. 3 through 5.

FIG. 3 is a perspective view showing a cellular phone according to an embodiment of the present invention. FIG. 4 is a partial cross-sectional view showing a rotation controller of a rotation unit of the cellular phone of FIG. 3. FIG. 5 is an exploded view showing the rotation controller of the rotation unit of the cellular phone shown in FIGS. 3 and 4. FIG. 6 is a cross-sectional view of the rotation controller of the rotation unit of the cellular phone shown in FIG. 3 through 5.

As shown in FIG. 3, the cellular phone includes a main body 50 having a key pad 52 and a microphone 54, and a folder 60 coupled to one end of the main body to be folded and unfolded with respect to the main body 50 and having an LCD display 62 and a speaker 64.

The main body 50 includes a pair of cylindrical supports 56 and a hinge 58 having a cylindrical shape disposed between the cylindrical supports 56 to be rotated with respect to a center of the cylindrical supports 56.

A lower end of the folder 60 is coupled to the hinge 58 in a perpendicular direction of a rotation center of the hinge 58 and/or the cylindrical supports 56 so that the folder 60 is folded and unfolded in a folding direction A. A rotation unit 80 is disposed on the lower end of the folder 60 so that the folder 60 is rotated in a rotating direction B while the folder 60 is unfolded.

That is, since the rotation unit 80, which is extended from the lower end of the folder 60, is connected to the hinge 58, the folder 60 is folded and unfolded together with the hinge 58 with respect to the main body 50 in the folding direction A and rotates with respect to a center of the rotation unit 80 in the rotating direction B when the folder 60 is unfolded with respect to the main body 50.

The rotation unit 80 can be automatically rotated by a motor M, which will be explained later, or can be manually rotated when the motor M is not operated.

A reference character SW is a switch to activate the motor M provided on the rotation unit 80, C is a camera provided on a portion of the hinge 80 to be rotated with respect to the hinge 58. The camera, however, can be provided on a portion of the folder 60 or the main body 50.

An operation of folding and unfolding the folder 60 with respect to the main body 50 in the folding direction A is referred to as "folding" (folding operation), and an operation of rotating the folder 60 in the rotating (first or second) direction B so as to cause the LCD display 62 to be disposed in different (front and rear) directions, is referred to as "rotating" (rotating operation).

As shown in FIG. 4, the rotation unit 80 includes the motor M installed in a lower inside portion of the folder 60 to generate a rotating (driving) force, and a power transmission unit (MG, SG) coupled to a first shaft S of the motor M to transmit the driving force of the motor M in a perpendicular direction.

The motor M is able to rotate in forward and reverse (opposite) directions and is a motor provided with a speed reduction member having gears having a speed reduction ratio of 500~600:1 to output a torque to rotate the folder 60 in the first or second direction. The speed reduction member of the motor M includes a plurality of satellite gears to amplify the torque of the motor M and to offset a cogging torque generated from the motor M.

Since the motor M or the first shaft S of the motor M is disposed on the folder in a horizontal direction parallel to the center of the cylindrical supports 56 and/or the hinge 58, the motor M does not interfere the LCD display 62. Therefore, the LCD display 62 is prevented from being reduced in screen size even if the rotation unit 80 is provided in the folder 60.

The rotation unit 80 is coupled to the power transmission unit (MG, SG) in a perpendicular direction and includes a rotation member 89 controlling a rotation of the power transmission unit (MG, SG) rotated by the motor M, and a housing H disposed to surround a rotation controller 89 to protect the rotation controller 89 and formed on the hinge 58 in the perpendicular direction with respect to the center of the cylindrical supports 56 and/or the hinge 58.

The power transmission unit (MG, SG) includes a pair of bevel gears, such as a driving gear MG coupled to the first shaft S and a driven gear SG being in contact with the driving gear MG.

The power transmission unit (MG, SG) can be provided with a mechanical apparatus having a cam and a joint which transmit the driving force of the motor M in the perpendicular direction. Any type of mechanical appearance can be used as the bevel gears.

The driven gear SG of the power transmission unit (MG, SG) incudes a second shaft S' extended from thereof, and the second shaft S' is formed with the folder 60 in an integrated body by a fixed member (W and SR or W1, SR1, W2, and SR2).

One set of the fixed member (W and SR) inserted around the second shaft S' includes a washer W and a snap ring SR elastically pushing the washer W to fixedly couple the second shaft S' to the folder 60. One of the washer W and the snap ring SR of the fixed member (W and SR) can be selectively used in the fixed member W and SR.

An outer surface of the second shaft S' is processed to strengthen a fixing force of the fixed member (W and SR), and another set of the fixed member (W and SR) is fixedly coupled to the processed surface of the second shaft S'.

The outer surface of the second shaft S' is provided with a bearing B to increase a rotation efficiency of the folder 60. A rolling bearing and a sliding bearing can be used as the bearing B.

The rotation controller 89 includes a male cam 84 connected to the second shaft S' of the driven gear SG, a female cam 86 coupled to the male cam 84 at a lower portion thereof to limit a movement of the male cam 84, and an elastic member 88 disposed below the female cam 86 to elastically support the female cam 86 and to maintain a combination state of the male cam 84 and the female cam 86.

The female cam 86 vertically reciprocates according to a rotation of the male cam 84 to selectively hold and release the male cam 84.

A third shaft sh is extended from a lower portion of the male cam 84 to prevent the male cam 84 from being separated from the hinge 58 of the main body 50. The third shaft sh is inserted into the female cam to be fixedly coupled to the hinge 58 through the housing H.

The third shaft sh includes a projection formed on a lower portion thereof to be fixedly coupled to the hinge 58, and the projection of the third shaft sh is hooked by a peripheral portion of the hinge 58.

A through hole 86*c* is formed on the female cam 86, the housing H, and the hinge 58 to receive the third shaft sh.

A connecting member, such as a nut, can be used as the projection formed on the lower portion of the third shaft sh.

If a thread is formed on the lower portion of the third shaft sh, the third shaft sh is coupled to the nut to fixedly couple the third shaft sh to the hinge 58.

As described above, in the rotation controller 89, the male cam 84 has a protrusion 84*a* formed with an oblique side (taper) at one end thereof opposite to the second shaft S' of the driven gear SG, and a groove 86*a* is formed on the female cam 86 to correspond to the protrusion 84*a* of the male cam 84.

The male cam 84 and the female cam 86 can be coupled by coupling the protrusion 84*a* and the groove 86*a*, and a movement of the male cam 84 is limited according to the combination of the male cam 84 and the female cam 86.

The female cam 86 moves to slip downward by oblique sides of the male cam 84 and the female cam 86, such as the protrusion 84*a* of the male cam 84 or the groove 86*a* of the female cam 86, according to a rotation of the male cam 84, thereby causing the male cam 84 to be released.

Meanwhile, at least one rotation preventing member 86*b* is formed on an outer surface of the female cam 86 to guide the female cam 86 to move in a vertical direction when the female cam 86 moves downward, and to prevent the female cam 86 from being rotateble with respect to the housing H.

A groove is formed on an inside surface of the housing H to correspond to the rotation preventing member 86*b* so as to prevent the rotation preventing member 86*b* from rotating. Since the rotation preventing member 86*b* is caught in the groove of the housing H, the female cam 86 can perform a rotation preventing function and a guiding function.

A reference character 86*c* is a through hole in which the third shaft SH of the male cam 84 is inserted.

The folder 60 becomes rotatable using the rotating unit 80 including the motor M, the power transmission unit (MG, SG) and the rotation controller 89.

An operation of rotating the folder 60 according to the rotation unit 80 will be described later. FIG. 4 is a partial cross-sectional view showing the rotation controller 89 of the rotation unit 80 of the cellular phone of FIG. 3. Referring to FIG. 4, the cellular phone includes a detecting unit (Ma, H1~H3) disposed on the folder 60 and the main body 50 to detect a rotation state and a folding state of the folder 60.

The detecting unit (Ma, H1~H3) is electrically connected to a control IC (not shown) to control the rotation unit 80. The detecting unit (Ma, H1~H3) includes a magnet Ma disposed on a lower portion of the folder 60, and first, second, third hall elements (H1, H2, H3) disposed on the main body 50 and the hinge 58 of the main body 50, respectively, to detect a magnetic field of the magnet Ma.

The first and second hall elements H1 and H2 are disposed on an upper portions of the main body 50, and the third hall element H3 is disposed on the hinge 58.

As shown in FIG. 4, in a case that the folder 60 is opened (unfolded), the third hall element H3 cannot detect the magnet Ma. Accordingly, he third hall element H3 cannot output a detecting signal to the control IC, and it is determined (detected) that the folder is rotated.

In contrast, in a case that the folder is closed (folded), the magnet Ma is disposed to face the first or second hall element H1 or H2. Accordingly, the first or second hall element H1 or H2 outputs the detecting signal, and it is determined (detected) that the folder 60 is closed (folded).

In another case that the folder 60 is closed after being opened in a normal state, the magnet Ma is disposed to face the second hall element H2. When the folder 60 is closed while being rotated by 180 i° after being opened in the normal state, the magnet Ma is disposed to face the first hall element H1.

When the detecting signal is outputted from the first hall element H1, the control IC determines that the folder 60 is closed in a state that the folder is rotated by 180 i° in an opposite state after being opened in the normal state. When the detecting signal is outputted from the second hall element H2, the control IC determines that the folder 60 is closed in the state that the folder is opened in the normal state.

As described above, the detecting unit (Ma, H1~H3) is formed in a non-contact type. However, the detecting unit (Ma, H1~H3) may be formed in a contact type. When the detecting unit (Ma, H1~H3) is formed in the contact type, a protrusion is formed on a place where the magnet Ma is disposed, and contact-switches are formed on places corresponding to the first, second, and third hall elements H1~H3.

The folder 60 can be controlled to be rotated by 180 i° by controlling a rotating time period taken to rotate the folder 60 by 180 i° or by controlling the number of rotations of the motor M corresponding to a 180 i° rotation of the folder 60.

As shown in FIG. 4, a rotation stopping unit (P, ST) is formed on the housing H of the rotation unit 80 and the folder 60 to stop the rotation of the folder 60 so as to control a more accurate rotation of the folder 60.

The rotation stopping unit (P, ST) includes a lower protrusion P protruding from a lower portion of the folder 60, and a stopper ST to stop the rotation of the folder 60 by stopping the rotation of the lower protrusion P which is rotated according to the rotation of the folder 60.

When the rotation of the folder 60 is stopped by contact between the lower protrusion P and the stopper St, an over-current which is greater than a normal current is generated from the motor which is activated to rotate. The control IC detects the over-current to stop the rotation of the motor M.

Since the stopper ST stops the rotation of the lower protrusion P, the folder 60 is prevented from rotating by a rotation angle more than 180 i°, that is, a normal rotation angle, after the folder 60 is opened (unfolded) in the normal state.

Accordingly, the folder 60 is prevented from rotating by the normal rotation angle, that is, 180 i°, a connecting cable, such as flexible PCB, connected between the main body 50 and the folder 60 is prevented from being twisted.

In this case, a contact switch, such as a limit switch, may be installed on a portion of the stopper ST. When the lower protrusion P contacts the limit switch, a driving power supplied to the motor M can be cut off. The limit switch can be replaced with a non-contact switch rather than a contact switch.

When the limit switch is provided on one of the folder 60 and the main body 50, the folder 60 is stopped from being rotated by cutting off the driving power of the motor M.

A reference numeral 59 of FIG. 4 is a rotation apparatus constituted of the motor M driving the hinge 58 to automatically folding and unfolding the folder 60 of the cellular phone. According to demands, the rotation apparatus can be formed on one of the hinge 68 and the supporting shaft 56. when the rotation apparatus is provided on the cellular phone, the folder 60 is automatically unfolded and folded by activating the motor.

The operation of the cellular phone according to the embodiment of the present invention will be explained hereinafter.

As shown in FIG. 4, in an automatic folding and/or unfolding operation, the folder 60, which is folded (closed) with respect to the main body 50, is manually or automatically unfolded (opened) according to the rotation apparatus, and the magnet Ma of the folder 60 is disposed to face the third hall element H3.

The third hall element H3 detects the magnet Ma to output the detecting signal to the control IC, thereby determining that the folder 60 is opened to a normal open state.

When the switch SW is controlled to activate the motor M, the control IC controls the motor M of the rotation unit 80 in a forward direction according to the detecting signal of the third hall element H3. The first shaft S and the driving gear MG are rotated by a rotation of the motor M.

The elastic member 88 of the rotation controller elastically supports the male cam 84 and the female cam 86, and the driven gear SG does not rotate since the male cam 84 is caught by the female cam 86.

Since the driven gear SG is not rotated, the driving gear MG rotates along gear threads forming an outer surface of the driven gear SG in a tangential direction. The motor M is rotated according to the rotation of the driving gear MG.

According to the rotation of the motor M, the folder 60 which is integrally formed with the motor M rotates with respect to the second shaft S' of the driven gear SG. In this rotating operation, the second shaft S' is smoothly rotates using the bearing coupled to the second shaft S'.

The folder 60 is controlled (rotated) in the first or second directions to dispose the LCD display 62 which has been in an opposite position to face a rear side of the folder 60 in the opposite state, in an initial position to face a front side of the folder 60 by 180 i° according to the time period or the number of rotations of the motor M set by the control IC.

Then, a user can look at the LCD display 62 in an opposite direction to an initial direction of the folder 60 with respect to the main body 50. When the user controls the cellular phone to sense an image using a camera C, the image sensed by the camera C is displayed on the LCD display 62 facing the opposite position in the opposite direction.

When the rotation of the folder by 180 i° is not controlled by the time period or the number of rotations of the motor M, the rotation stopping unit (P, ST) having the limit switch can be used to accurately control the rotation of the folder 60.

When the rotation of the folder 60 is completed, the magnet Ma disposed on the folder 60 is disposed opposite to the third hall element H3, and thud the third hall element H3 cannot detect the magnet Ma.

When the user automatically or manually folds the folder 60 with respect to the main body 50, the folder 60 moves together with the hinge 58 to close the main body 50, and then the magnet Ma is disposed to face the first hall element H1.

The first hall element H1 detects the magnet Ma to output the detecting signal to the control IC, and the control IC determines according to the detecting signal of the first hall element H1 that the folder 60 is closed while the LCD display 62 is disposed to face the opposite direction.

Accordingly, the control IC controls the motor M to rotate in a direction opposite to the forward direction to rotate the folder 60 to place the LCD display 62 in the initial direction when the switch SW is controlled (manipulated) to activate the motor M of the rotation unit 80.

That is, when the user opens the folder 60 of which LCD display 62 is disposed to face the opposite direction and controls the switch SW, the control IC outputs a reverse control signal to the motor M to rotate the motor M in the direction opposite to the forward direction to place the LCD display 62 in the initial position.

Since a reverse rotation sequence of the folder 60 is a reverse operation of the above-described rotation from the normal open state (position) to a 180 iÆ position, that is, the opposite state (position), detailed description of the reverse rotation of the folder 60 is omitted.

When the folder 60 becomes disposed to be in the normal open state, the user closes the folder 60 with respect to the main body 50, and then the magnet Ma is disposed to face the second hall element H2. The second hall element H2 outputs the detecting signal to the control IC so as for the control IC to determines that the folder 60 is closed while being in the normal open state.

As described above, the folding and unfolding operation of the folder 60 is completed in the cellular phone according to an aspect of the present invention.

The folder 60 is rotateble with respect to the main body 50 in the first and second directions by 180 iÆ and also in the second direction by 360 iÆ after rotating in the first direction by 180 iÆ.

That is, when the folder 60 is opened in the normal open state, the folder 60 rotates in the first or second direction by 180 iÆ or rotates in the first direction by 180 iÆ and then in the second direction by 360 iÆ.

Since the folder 60 is stopped from rotating by the lower protrusion P and the stopper ST of the rotation stopping unit (P, ST) after rotating by 180 iÆ or 360 iÆ, the connecting cable, such as flexible PCB, connected between the main body 50 and the folder 60 is prevented from being twisted.

As described above, in the cellular phone, the folder 60 is automatically rotated. In contrast, a manual operation of rotating the folder 60 is explained hereinafter.

When the user manually rotates the folder 60, the folder 60 is rotated. However, the driving gear MG and the driven gear SG of the power transmission unit (MG, SG) are engaged with each other in a stationary coupling state and prevented from being rotated due to coupling with satellite gears provided in a speed reduction unit of the motor M.

Therefore, the driving gear MG and the driven gear SG of the power transmission unit (MG, SG) are not rotated even though the folder 60 is rotated.

However, the second shaft S' of the driven gear SG which is fixed to the folder 60 is rotated according to a rotation of the folder 60.

The male cam 84 rotates according to the rotation of the second shaft S', and then the female cam 86 slides downward by Δl to compress the elastic member 88 while the male cam 84 rotates.

The male cam 84 is released from a control of the female cam 86 and rotates while being pivotally supported by the groove 86a of the female cam 86, and thus, the folder 60 becomes manually rotatable.

In the manual rotation of the folder 60, the folder 60 is prevented from being rotated by the lower protrusion P and the stopper ST of the rotation stopping unit (P, ST), and the folding and unfolding states of the folder 60 are detected by the magnet Ma and the first through third hall elements H1~H3 of the detecting unit (Ma, H1~H3)

The manual rotation of the folder 60 is finished, the male cam 84 and the female cam 86 of the rotation controller 89 becomes being coupled to each other to prevent the rotation of the folder 60.

That is, after the rotation of the folder 60 is completed, the folder 60 does not rotate since the male cam 84 and the female cam 86 of the rotation controller 89 are coupled to each other even though an external force is exerted on the folder 60.

Figure 7:
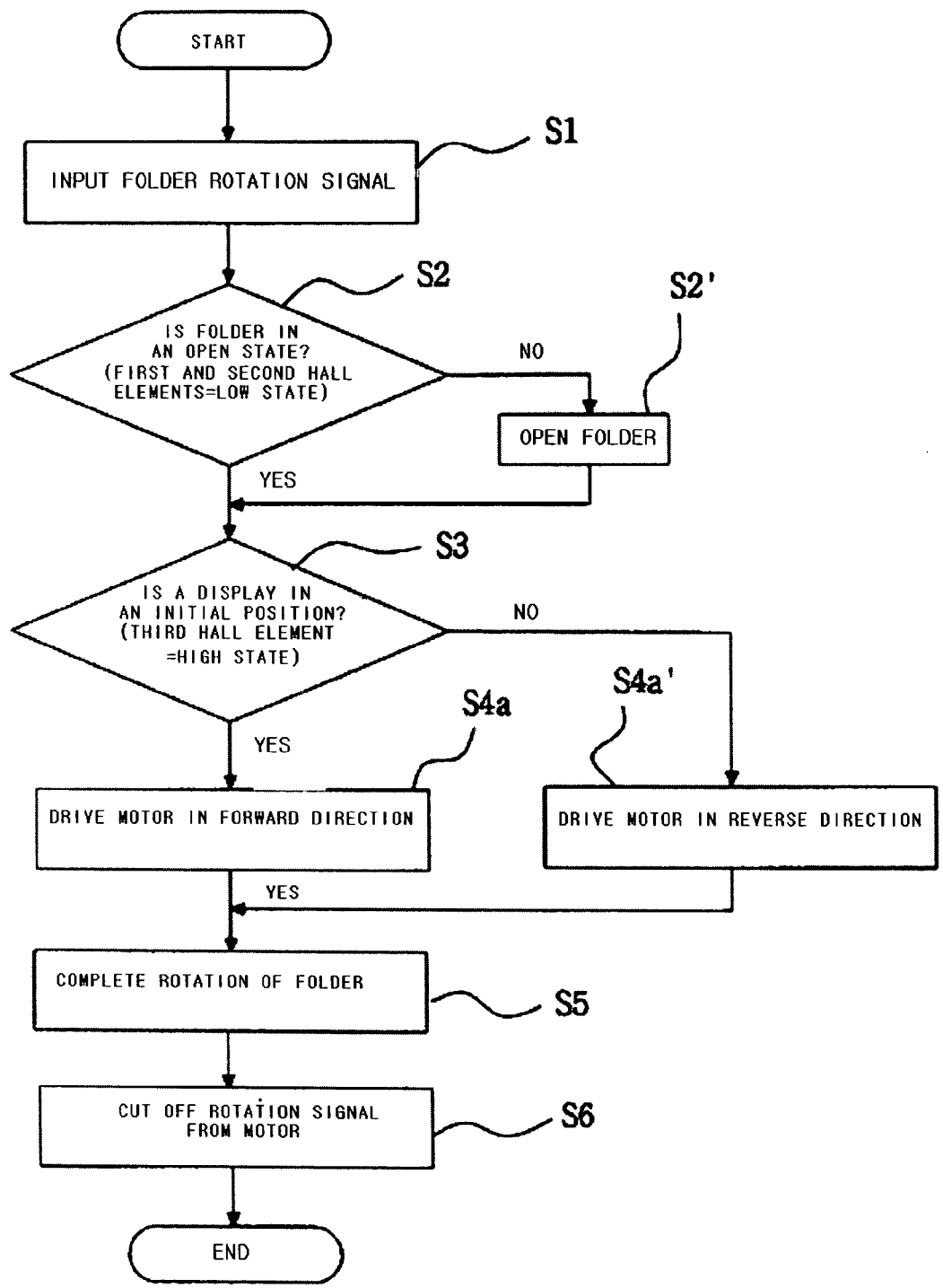
FIG. 7 is a flow chart showing an automatic rotation method used with the cellular phone shown in FIGS. 4 through 6.

As described above, the automatic rotation method of the cellular phone is described in FIG. 7 according to the present invention. FIG. 7 is a flow chart showing the automatic rotation method used with the cellular phone shown in FIGS. 4 through 6.

Referring to FIG. 7, the automatic rotation method of the folder 60 includes an operation S1 of inputting a rotation signal by manipulating the switch SW to rotate the motor M of the rotation unit 80, and an operation S2 of determining whether the folder is opened or closed, to rotate the folder 60 according to the rotation signal.

When the folder 60 is in the normal open state, output signals of the first and second hall elements H1 and H2 become in a low state since the first and second hall elements H1 and H2 cannot detect the magnet Ma. When the folder 60 is not in the normal open state but in a closed state, one of the output signals of the first and second hall elements H1 and H2 becomes in a high state since one of the first and second hall elements H1 and H2 detects the magnet Ma.

If one of the first and second hall elements becomes in the high state, an operation S2' of determining whether the LCD display 62 is in the initial position or in the opposite position is performed in the operation S2.

It is determined in an operation S3 whether the folder 60 is in the normal open state and the LCD display 62 is in the initial position to face the front side of the folder 60, e.g., in the front direction, or whether the folder 60 is in the normal open state and the LCD display 62 is in the opposite position to face the opposite position, e.g., in the rear direction.

When the LCD display 62 is in the initial position in the normal open state of the folder 60, the third hall element H3 can detect the magnet Ma to generate the output of the high state, and then the control IC determines that the folder 60 is opened in the normal open state.

And then, the rotation direction of the folder 60 is determined in operation S4 according to a direction of the LCD display 62 of the folder 60.

The operation S4 performs a first sub operation S4a of controlling the motor M to rotate in the forward direction or performs a second sub operation S4b of controlling the motor M to rotate in the reverse direction.

That is, when the LCD display 62 is disposed in the initial direction to face the front side of the folder, the motor M is controlled to rotate in the forward direction to rotate the folder 60 in the first direction. When the LCD display 62 is disposed in the opposite position to face the rear side of the folder 60, the motor M is controlled to rotate in the reverse direction to rotate the folder 60 in the second direction.

The automatic rotation method of the folder 60 includes an operation S5 of terminating the rotation of the folder 60 according to the time period or the number of rotations of the motor M or an activation of the rotation stopping unit (P, ST).

In addition, the automatic rotation of the folder 60 includes an operation S6 of terminating the automatic rotation of the motor M according to the termination of the rotation of the folder 60.

Figure 8:
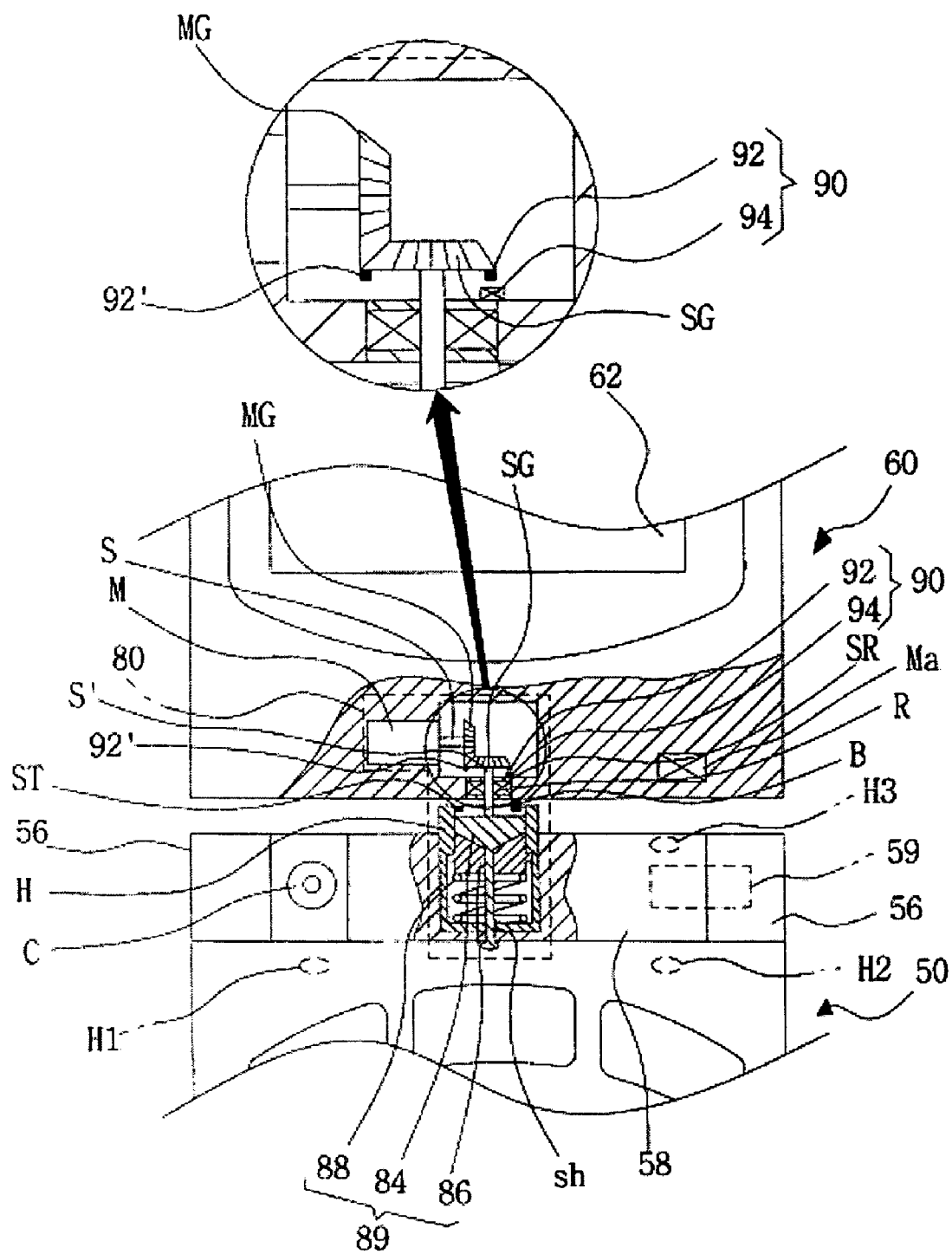
FIG. 8 is a cross-sectional view of another rotation unit of the cellular phone shown in FIG. 3 according to another embodiment of the present invention.

FIG. 8 is a cross-sectional view of another rotation unit 80 of the cellular phone shown in FIG. 3 according to another embodiment of the present invention. The rotation unit 80 is provided with a rotation termination detecting unit 90 disposed below the driven gear SG of the power transmission unit (MG, SG) to detect a termination of the rotation of the folder 60.

Referring to FIG. 8, the rotation unit 80 includes the motor M, the power transmission unit (MG, SG) having the driving gear MG and the driven gear SG coupled to the motor M, the rotation controller 89 coupled to the power transmission unit (MG, SG), and the housing H containing the rotation controller 89.

The rotation termination detecting unit 90 is disposed below the driven gear SG and includes first and second fixed terminals 92 and 92' installed to be spaced-apart at an interval of 180° and a rotation terminal 94 installed below the first and second fixed terminals 92 and 92' to be coupled to one of the first and second fixed terminals 92 and 92'.

It is possible that the rotation terminal 94 is fixed on the folder as shown in FIG. 8.

In the rotation termination detecting unit 90 having the above structure, the first and second fixed terminals 92 and 92' output an electrical signal upon contacting the rotation terminal 94. However, the rotation termination detecting unit 90 can be implemented with a non-contact type, such as a magnet sensor or a photo sensor, which can generate the electrical signal without contacting each other.

When the electrical signal is outputted to the control IC from the rotation termination detecting unit 90 by a mutual action of the rotation terminal 94 and the first and second fixed terminals 92 and 92', the control IC determines that the rotation of the folder 60 is completed, and cuts off the driving power from the motor M to terminate the rotation of the folder 60.

An operation of the cellular phone having the rotation termination detecting unit 90 is explained hereinbelow. the motor M is rotated to rotate the folder 60 by rotating the driving gear MG along the outer surface of the driven gear SG in the tangential direction of the driven gear SG.

The rotation terminal 94 installed on the folder 60 is rotated together with the folder to be disposed on an opposite side to an original side of the folder 60.

That is, the rotation terminal 94 facing the first fixed terminal 92 is rotated to be disposed to face the second fixed terminal 92' which is disposed on the opposite side of the folder 60.

The rotation terminal 94 outputs the electrical signal to the control IC when contacting the second fixed terminal 92', and the control IC terminates the rotation of the motor M by determining that the rotation of the folder 60 is completed.

According to the termination of the rotation of the motor M, the rotation of the folder 60 is terminated.

The open or closed state of the folder 60 can be determined by determining which one of the first and second fixed terminals 92 and 92' is in contact with the rotation terminal 94 of the rotation termination detecting unit 90.

That is, depending on a contact state of the rotation terminal 94 of the rotation termination detecting unit 90 with the first and second fixed terminals 92 and 92', it is determined that the LCD display 62 of the folder 60 is disposed in the initial position or in the opposite position.

For example, if the rotation terminal 94 is in contact with the first fixed terminal 92, it is determined that the folder 60 has been rotated so that the LCD display 62 is disposed in the initial position. In contrast, if the rotation terminal 94 is in contact with the second fixed terminal 92', it is determined that the folder 60 has been rotated so that the LCD display 62 is disposed in the opposite position.

Accordingly, a state in which the rotation of the folder 60 is completed, as well as another state in which the folder 60 is rotated so that the LCD display 62 is disposed in the initial or opposite direction, are detected using the rotation termination detecting unit 90.

Figure 9:
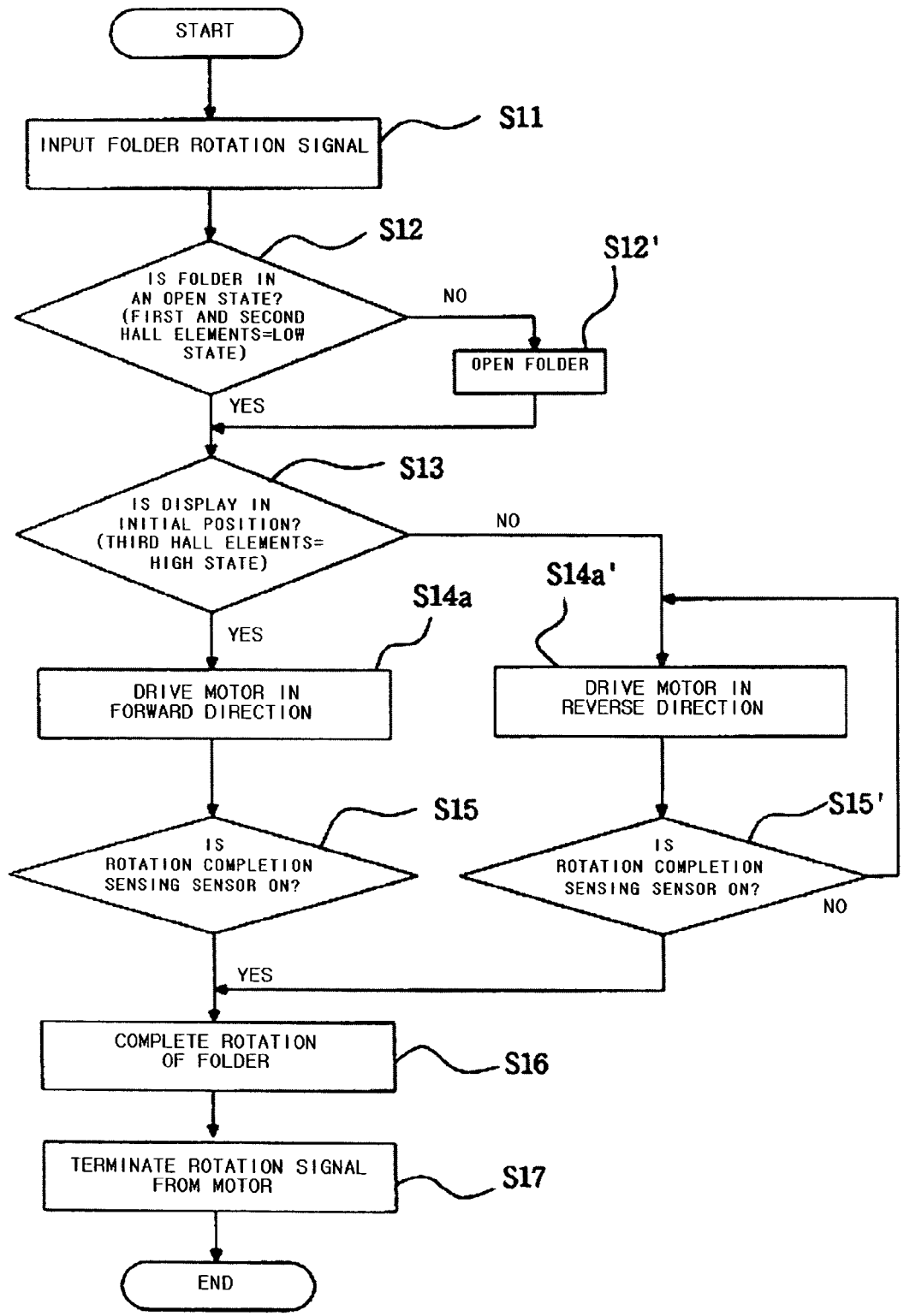
FIG. 9 is a flow chart showing an automatic rotation method used with the cellular phone shown in FIGS. 3 and 8.

FIG. 9 is a flow chart showing the automatic rotation method used with the cellular phone shown in FIGS. 3 and 8 according to another embodiment of the present invention.

Referring to FIG. 9, the automatic rotation method includes an operation S11 of inputting the rotation signal by controlling the switch SW to activate the motor M of the rotation unit 80, and an operation S12 of determining whether the folder is opened or closed so as to rotate the folder 60 according to the rotation signal.

When the folder 60 is opened, the first and second hall elements H1 and H2 does not detect the magnet Ma to output the detecting signal of the low state, and when the folder 60 is not opened, one of the first and second hall elements H1 and H2 can detect the magnet Ma to output the detecting signal of the high state.

When the one of the first and second hall elements H1 and H2 outputs the detecting signal of the high state, an operation S12' of opening the folder 60 is performed to open the folder 60, which has been in the closed state in operation S12'.

It is determined in operation S13 that the folder 60 is opened in the normal open state and the LCD display 62 is disposed in the initial position, or that the folder 60 is opened in the opposite open state position and the LCD display 62 is disposed in the opposite position.

When the LCD display 62 is disposed in the initial position, the third hall element H3 detects the magnet Ma to output the detecting signal of the high state, and the control IC determines that the folder is opened in the normal open state.

The rotation direction of the motor M is determined according to the direction of the LCD display 62 of the folder 60, and the motor M is rotated to rotate the folder 60 according to the determined rotation direction in operation S14.

In the operation S14, operation S14a of rotating the motor M in the forward direction according to the direction of the LCD display 62 is performed, or operation S14a' of rotating the motor in the reverse direction according to the direction of the LCD display 62.

That is, when the LCD display 62 is disposed in the initial position to face the front side of the folder 60, the motor M is rotated in the forward direction so that the folder 60 is rotated in the first direction to dispose the LCD display in the opposite position. When the LCD display 62 is disposed in the opposite position to face the rear side of the folder 60, the motor M is rotated in the reverse direction so that the folder 60 is rotated in the second direction to dispose the LCD display in the initial position.

The rotation termination detecting unit 90 is rotated together with the folder 60 which is rotated according to the driving force of the motor M to detect whether the rotation of the folder 60 is completed.

The rotation method also includes operations S15 and S15' of determining whether the rotation termination detecting unit 90 is on by completing the rotation of the folder 60.

In operation S15, the rotation of the folder 60 in the first direction is completed by the forward rotation of the motor M, and in operation, the rotation of the folder 60 in the second direction is completed by the reverse rotation of the motor M.

The rotation method also includes operation S16 of terminating the automatic rotation of the folder 60 by cutting off the rotation signal from the motor M according to an on signal of the rotation termination detecting unit 90 when the rotation of the folder 60 is completed.

As described above, in the cellular phone according to the above embodiments of the present invention, the folder 60 can be automatically or manually rotated when the folder 60 is unfolded (opened).

According to the automatic rotation method of the folder 60 including operations S1 through S6 or operations S11 through S16, the folding state and the unfolding state of the folder 60 is automatically detected, the folder 60 is automatically rotated according to the unfolding state of the folder 60, and the rotation of the folder 60 can be terminated when the rotation of the folder 60 is completed.

Figure 10:
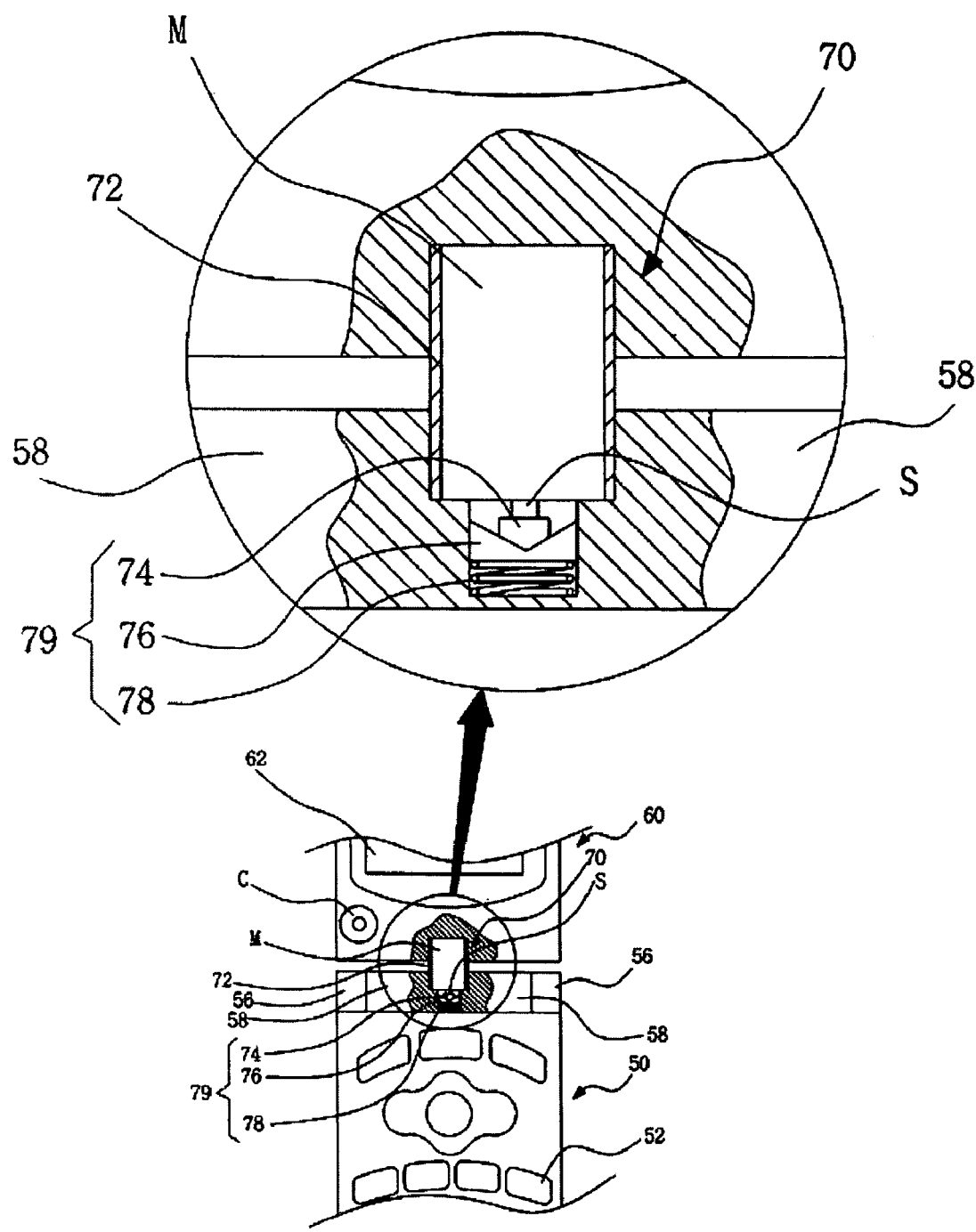
FIG. 10 is a cross-sectional view of another rotation unit of the cellular phone shown in FIG. 3 according to another embodiment of the present invention.
Figure 11:
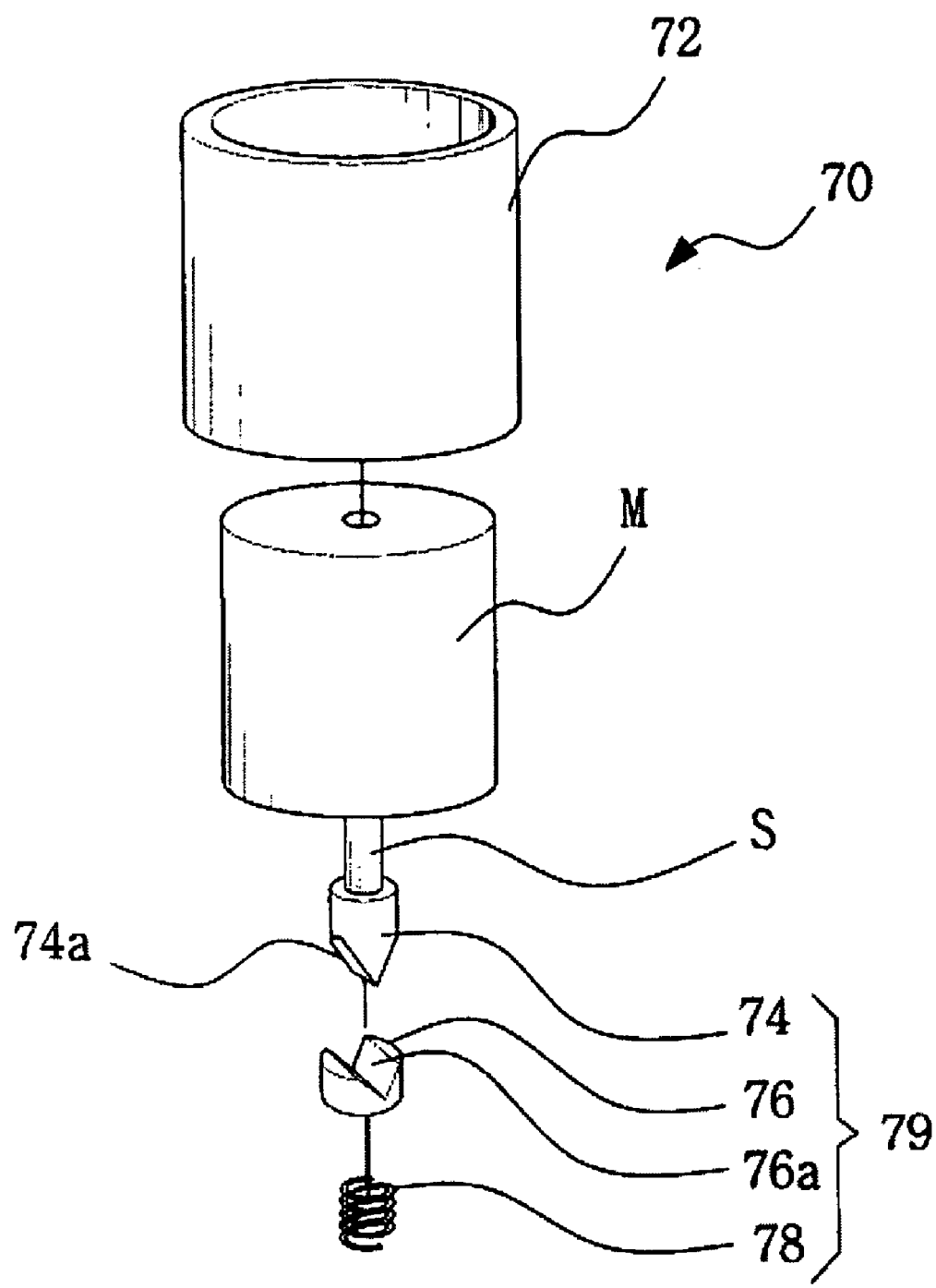
FIG. 11 is an exploded view showing the rotation unit shown in FIG. 10.

FIG. 10 is a cross-sectional view of another rotation unit 70 of the cellular phone shown in FIG. 3 according to another embodiment of the present invention, and FIG. 11 is an exploded view showing the rotation unit 70 shown in FIG. 10.

Referring to FIGS. 3, 10, and 11, the rotation unit 70 includes the motor rotating in the forward and reverse directions having the first shaft S fixedly coupled to the lower portion of the folder 60 in a vertical direction, a cylindrical case 72 fixedly mounted at an outer side of the motor M to protect the outside of the motor M, and a rotating shaft controller 79 coupled to the first shaft S to limit a rotation of the first shaft S so as to prevent the first shaft S from being rotated.

Here, the motor M is a motor having a speed-reduction gear unit having a speed reduction ratio of 500~600:1 to increase a torque rotating the folder 60. A satellite gear unit can be used as the speed reduction gear unit.

The satellite gear unit as the speed-reduction gear unit includes a plurality of satellite gears to generate an effective rotating force for the rotation of the folder by reducing the rotation speed of the motor M to a predetermined reduced speed.

The rotating shaft controller 79 is contained in the hinge 58 provided in the main body 50 and includes a male cam 74 coupled to the first shaft S of the motor M, a female cam 76, and an elastic member 78 disposed at a lower portion of the female cam 76 to elastically support the female cam 76.

The male cam 74 includes a projection 74*a* having tapered sides formed on both sides thereof, and the female cam 76 includes a groove 76*a* to correspond to the projection 74*a* of the male cam 74.

The projection 74*a* of the male cam 74 is inserted into the groove 76*a* of the female cam 76 so that the male cam 74 and the female cam 76 are coupled to each other.

The elastic member 78 is installed at the lower portion of the female cam 76 opposite to the groove 76*a* to elastically maintain a coupling state of the male cam 74 and the female cam 76. It is possible that a compressed coil spring is used as the elastic member 78 to elastically support the female cam 76.

Any type of an element, such as the compressed coil spring, a plate spring, or a rubber material, having an elastic force can be used as the elastic member 78

The elastic member 78 needs to have the elastic force to elastically support the female cam 76 to limit a rotation of the male cam which rotate together with the first shaft S of the motor M, and also the elastic member 78 has the elastic force to be compressed to release the male cam 74 from the female cam 76 when a user manually manipulates the folder 60 to rotate the motor M rather than activating the motor M.

The elastic member 78 elastically supports the female cam 76 when the folder 60 is rotated by a rotation of the motor M to maintain the coupling state between the male cam 74 and the female cam 76. In contrast, when an external force which is greater than the rotation force of the motor M, is exerted on the folder 60 to rotate the motor M, the elastic member 78 is compressed to release the male cam 74 from the coupling state of the female cam 76 and the male cam 74.

Therefore, the elastic member 78 has the elastic force which corresponds to the rotation force of the motor M and is less than the external force.

In the cellular phone according to the embodiment of the present invention, after the folder 60 is opened with respect to the main body 50, the folder 60 can be rotated by the external force or the rotation force of the motor M in the direction B.

In an operation of automatically rotating the folder 60 using the motor M, the switch SW or a key pad 52 of the main body is manipulated to supply an electrical power to activate the motor M.

When the motor rotates the first shaft S, the first shaft S is not rotated due to the coupling state of the projection 74*a* of the male cam 74 and the groove 76*a* of the female cam 76. Rather, the motor is rotated with respect to the main body 50 to rotate the folder 60, fixedly coupled to the motor M, in the direction B.

That is, the motor M is a rotor, and the first shaft S is a stator. Therefore, the folder 60 rotates in a desirable direction according to the rotation of the motor M.

In contrast, when the folder 60 is rotated in the direction B using the external force, which is greater than the rotation force of the motor M, rather than activating the motor M, the motor M is rotated according to the rotation of the folder 60, and the first shaft S is rotated together with the motor M according to the rotation of the motor M in the same direction.

At this moment, the projection 74*a* of the male cam 74 coupled to the first shaft S is accordingly rotated, and the female cam 86 is pushed downward according to a driving force of the projection 76*a*.

Hereinafter, an operation of slidably pushing the female cam 76 downward will be explained. When the projection 74*a* of the male cam 50 is rotated, a downward sliding movement of the female cam 76 is performed according to a tapered surface of the groove 76*a* of the female cam 76 and the projection 74*a* of the male cam 74, and then the elastic member 78 cannot stand the external force by the the male cam 74 to be compressed.

The projection 74 of the male cam 74 is released from a control of the groove 76*a* of the female cam 76 and rotates while one end of the projection 74*a* of the male cam 74 pivots in the groove 76*a* of the female cam 76.

In a state in which the projection 74*a* of the male cam 74 is in close contact with the groove 76*a* of the female cam 76, the one end of the projection 74*a* of the male cam 74 is enabled to pivot in the groove 76*a* of the female cam 76. The folder 60 rotates in the direction B together with the male cam 74, the first shaft S, and the motor M, and then the manual rotation of the folder 60 is also enabled.

In other word, the rotation shaft controller 79 is supposed to cause the motor M to be smoothly rotated when the motor M is automatically or manually rotated by the power or the external force.

In order to widen an rotation angle of the folder 60 in the automatic rotation operation, the power is supplied to the motor M in a longer time period by manipulating the switch SW or the key pad 52. In contrast, in order to narrow the rotation angle of the folder 60 in the automatic operation, the power is supplied to the motor M in a shorter time period.

Since the motor is activated to rotate in proportion to the time period in which the power supplied to the motor M, the user may set a desired rotation angle to place the LCD display 62 in a desired position.

The control IC disposed in the main body 50 is programmed to cut off the power from the motor M to stop the rotation of the motor M when the folder 60 is rotated at a maximum rotation angle. The cutting off the power from the motor M is controlled by setting or changing the time period and the number of rotations of the motor M.

The maximum rotation angle of the folder 60 can be calculated from the number of rotations of a rotor (not shown) contained in the motor M or from the time period for the rotation of the motor M.

When the folder 60 is rotated at the maximum rotation angle, the power supplied to the motor M is cut off to prevent an overload of the motor M, thereby providing a stable and reliable operation of driving the motor M without breaking the motor M.

As described above, in the cellular phone according to embodiments of the present invention, the folder 60 is automatically and manually rotated with respect to the rotation unit 70 so that the user is able to look at the LCD display 62 of the folder 60 at the desired rotation angle.

Figure 12:
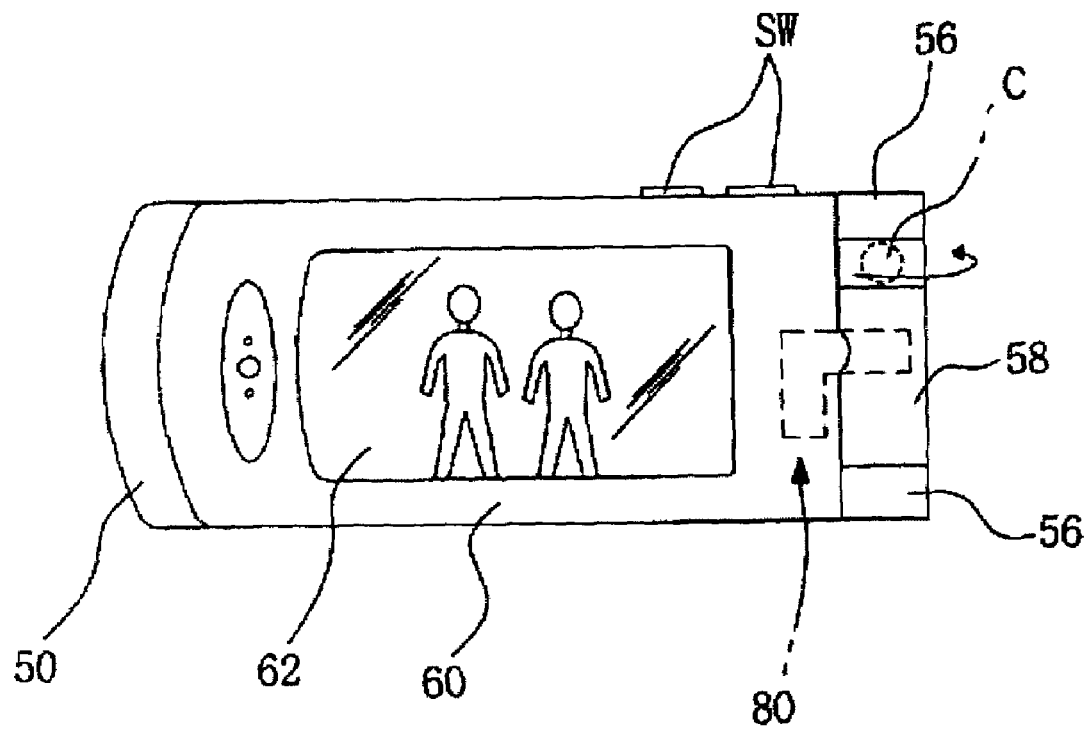
FIG. 12 is a view showing the cellular phone used as a camera.

The user may control the folder, which is in the normal or opposite open state, to rotate automatically, and the user can control the rotation angle or a rotation position of the folder 60 with one hand FIG. 12 is a view showing the cellular phone used as a general type of a camera. After the folder 60 is rotated using the rotation unit 80 to dispose the LCD display 62 in the opposite position, and the folder is folded to close the main body 50, the camera C is moved to an object so as to to sense the object.

When an sensed image of the object is displayed on the LCD display 62, the user confirms the sensed image through the LCD display 62 or stores the sensed image using the switch used for a shutter function. It is very convenient that the cellular phone can be used as the general type of the camera.

As explained above, the cellular phone according to the embodiments of the present invention is able to automatically or manually rotate in the normal or opposite open state. When the folder is automatically rotated, the user can control the rotation angle using one user hand to place the LCD display in the desired rotation position at the desired rotation angle, thereby providing the convenience in using the cellular phone.

Moreover, the structure of the rotation unit to rotate the folder is designed not to interfere the LCD display of the folder. Therefore, the LCD display should not be necessarily reduced in size when the rotation unit is employed in the cellular phone.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed:

1. A cellular phone providing wireless communication, comprising: a main body having a key pad and a hinge thereof along a folding and unfolding axis; a folder having a display displaying data received from the main body; a driving source disposed on a lower portion of the folder along the folding and unfolding axis to generate a driving force; a power transmission unit having one end coupled to the driving source and the other end coupled to the folder to transmit the driving force to folder to rotate with respect to the main body when the folder is in an open state; and a rotation controller coupled to the power transmission unit, disposed in a housing installed at the hinge of the main body in a rotating axis perpendicular to the folding and unfolding axis to automatically and/or manually rotate the folder with respect to the main body;

wherein the power transmission unit comprises: a pair of bevel gears having a driving gear coupled to the driving source and a driven gear coupled to the driving gear and having a shaft fixedly coupled to the folder, wherein the power transmission unit further comprises: a fixed member disposed on outside surface of the shaft provided on the driven gear to couple the shaft to the folder, wherein the fixed member comprises: a washer having a ring shape; and a snap ring disposed on the washer to elastically press the washer.

2. The cellular phone of claim 1, wherein the shaft of the driven gear comprises: a bearing disposed on the outside surface of the shaft of the driven gear contacting the folder to increase a rotation efficiency of the folder.

3. The cellular phone of claim 1, wherein the rotation controller comprises: a male cam having one end coupled to the power transmission unit and the other end formed with a projection with tapers on both sides thereof; a female cam having a groove corresponding to the projection to selectively receive the projection of the male cam to control the male cam; and an elastic member disposed below the female cam opposite to the groove to elastically support the female cam to limit a movement of the female cam, and being compressed when the male cam rotates, to release the male cam from the female cam.

4. The cellular phone of claim 3, wherein the projection of the male cam comprises: a center shaft extended from the male cam in a direction to the female cam to penetrate the female cam, the housing, and the hinge of the main body to be rotatably fixed on an external side of the hinge.

5. The cellular phone of claim 3, wherein the female cam comprises: at least one rotation preventing member formed on an outer surface of the female cam; and a coupling groove formed on an inside surface of the housing to correspond to the rotation preventing to prevent the female cam from being rotated when the rotation preventing member is caught the coupling groove.

6. A cellular phone providing wireless communication, comprising: a main body having a key pad and a hinge thereof along a folding and unfolding axis; a folder having a display displaying data received from the main body; a driving source disposed on a lower portion of the folder along the folding and unfolding axis to generate a driving force; a power transmission unit having one end coupled to the driving source and the other end coupled to the folder to transmit the driving force to folder to rotate with respect to the main body when the folder is in an open state; and a rotation controller coupled to the power transmission unit, disposed in a housing installed at the hinge of the main body in a rotating axis perpendicular to the folding and unfolding axis to automatically and/or manually rotate the folder with respect to the main body, wherein the folder and/or the power transmission unit comprises: a rotation termination detecting unit detecting completion of the rotation of the folder to terminate the rotation of the driving source, wherein the rotation termination detecting unit comprises: at least one fixed terminal disposed on the power transmission unit; and a rotation terminal disposed on the folder to correspond to the fixed terminal, and rotating together with the folder, and detecting the termination of the rotation of the folder when the rotation terminal correspond to the fixed terminal.

7. The cellular phone of claim 6, wherein the fixed terminal comprises: first and second sub-fixed terminals disposed around the power transmission unit to be spaced-apart at an interval of 180°.

8. The cellular phone of claim 6, wherein the fixed terminal comprises a magnet, and the rotation terminal comprises a hail element to detect a magnetic field generating from the magnet to detect the completion of the rotation of the folder.

9. A cellular phone providing wireless communication, comprising: a main body having a key pad and a hinge thereof in a folding and unfolding axis; a folder having a display displaying data received from the main body; a rotation unit having one end coupled to the folder and the other end coupled to an inside of the hinge in a rotation axis perpendicular to the folding and unfolding axis to allow the folder to be folded and unfolded with respect to the main body, and automatically or manually rotating the folder with respect to the main body according to a user selection when the folder is in an open state, wherein the rotation unit comprises: a motor fixedly coupled to the folder; and a rotation shaft controller disposed in the main body to be coupled to a shaft of the motor to control a rotation of the shaft.

10. The cellular phone of claim 9, wherein the rotation shaft controller comprises: a male cam having one end coupled to the shaft of the motor and having the other end formed with a projection having tapered surfaces; a female cam having a groove corresponding to the projection of the male cam to limit a movement of the male cam by a coupling state of the groove and the projection; and an elastic member disposed below the female cam, having an elastic force which is greater than a driving force of the motor and less than an external force exerted on the folder to manually rotate the folder to elastically support the female cam with respect to the male cam and to selectively limit the movement of the male and female cams.

11. A cellular phone providing wireless communication, comprising: a main body having one of a key pad and a display, and having a hinge thereof along a folding and unfolding axis; a folder having the other one of the key pad and the display, and coupled to the hinge to be folded and unfolded about the folding and unfolding axis with respect to the main body in a folding and unfolding direction perpendicular to the folding and unfolding axis; a rotation unit having a first portion fixedly coupled to the folder along the folding and unfolding axis, a second portion fixedly coupled to the main body along the rotation axis, and a third portion coupled to transmit a driving force between the first portion and the second portion to rotate the folder in first and second directions about a rotation axis perpendicular to the folding and unfolding axis with respect to the main body.

12. The cellular phone of claim 11, wherein the rotation unit comprises: a driving source disposed in the first portion of the folder, and having a shaft extended along the folding and unfolding axis to generate a driving force; and a power transmission unit disposed in the third portion of the folder, and having one end coupled to the driving source and the other end coupled to the folder to transmit the driving force to folder to rotate with respect to the main body when the folder is in an open state.

13. The cellular phone of claim 12, wherein the main body comprises a housing disposed in the second portion of the rotation unit, and the rotation unit further comprises: a rotation controller disposed in the housing to be coupled to the power transmission unit and to control the third portion to automatically and/or manually rotate the folder with respect to the main body.

* * * * *